United States Patent [19]

Cimenti

[11] Patent Number: 5,320,032
[45] Date of Patent: Jun. 14, 1994

[54] CITRUS-FRUIT SQUEEZING MACHINE

[76] Inventor: Antonio Cimenti, Localita Fontane, 3, Polcenigo (Pordenone), Italy

[21] Appl. No.: 4,573

[22] Filed: Jan. 14, 1993

[30] Foreign Application Priority Data

Jan. 17, 1992 [IT] Italy .................... PN92A000005

[51] Int. Cl.⁵ .................. A23N 1/02; A47J 19/02; B30B 9/02
[52] U.S. Cl. ........................ 99/510; 99/495; 100/98 R; 100/125; 100/131
[58] Field of Search .............. 99/495, 509, 510, 513, 99/349; 100/98 R, 125, 131, 134, 135, 233, 264, 266, 218

[56] References Cited

U.S. PATENT DOCUMENTS

| | | | |
|---|---|---|---|
| 2,067,555 | 1/1937 | Walker | 100/131 |
| 2,454,256 | 11/1948 | Myers | 100/98 R |
| 2,667,118 | 1/1954 | Nelson | 99/495 |
| 3,673,952 | 7/1972 | Dubin, III | 100/98 R |
| 4,088,070 | 5/1978 | Montagroni et al. | 99/509 |
| 4,154,163 | 5/1979 | Niemann | 99/495 |
| 4,924,770 | 5/1990 | Raub | 99/511 |
| 5,031,524 | 7/1991 | Wettlaufer | 99/510 |
| 5,035,174 | 7/1991 | Seal, Jr. | 100/131 |
| 5,097,757 | 3/1992 | Antonio | 100/125 |
| 5,199,348 | 4/1993 | Cimenti | 99/510 |

FOREIGN PATENT DOCUMENTS

0366881 5/1990 European Pat. Off. ............. 99/495

*Primary Examiner*—Timothy F. Simone
*Attorney, Agent, or Firm*—Wenderoth, Lind & Ponack

[57] ABSTRACT

A citrus fruit squeezing machine has a section for accumulating and feeding the fruit, a section for squeezing the fruit and respective sections for conveying and collecting the juice and the peels of the squeezed fruit. The section for squeezing the fruit includes two plates disposed laterally as well as symmetrically to a cutting blade. The plates are supported in such a way as to be convergent and inclined downwards and towards the cutting blade. The cutting blade is fitted on a support plate having its lower part pivoted on the framework of the machine. The support plate is also connected with a toggle compound lever which can be manually driven or driven by a motor. The toggle compound lever moves the support plate towards the plates which are both straddled by the cutting blade when they are in the starting position. At first, the cutting blade moves toward the piece of fruit and cuts a fairly good part of it. Then, arms of the support plate impact corresponding rolls on the plates and drive the plates toward each other with the consequent squeezing of the fruit.

17 Claims, 5 Drawing Sheets

CITRUS-FRUIT SQUEEZING MACHINE

BACKGROUND OF THE INVENTION

The present invention relates to a new citrus-fruit squeezing machine, in particular to a machine for squeezing oranges and the like that has a very simple structure and operation and, moreover, which squeezes the fruit after cutting the same into two parts.

Various kinds of machines for squeezing citrus-fruit are already known.

The machines are structurally complicated and possess some functional restrictions.

Some kinds of such known machines perform the cutting of the fruit before squeezing the same. This is carried out by devices for catching and conveying a single piece of fruit to the cutting and squeezing devices.

These devices are rather complicated and work only if fed fruit of adequate sizes or fruit having only very limited overall size differences.

Therefore, the user must previously gauge and select the fruit to be squeezed.

Also the cutting and squeezing devices are complicated and frequently do not effect an ideal squeezing operation.

There are other well known machines that are more simple with respect to both their structures and their operating modes such as those described in Italian Patent Application Nos. 45784 A/89 and 45769 A/90 respectively filed on Oct. 19, 1989 and Nov. 8, 1990 by the same inventor.

Such machines also possess some drawbacks as follows.

The squeezing operation is essentially carried out through the simple squashing of the fruit between two opposite plates without the previous cutting of the fruit.

It follows that the squashing causes both the squeezing of the citrus-fruit and the extraction from its peel of oils and other essential substances that mix with the fruit's juice and alter its taste.

This drawback is not sufficiently obviated even by providing a blade on a squeezing plate in such a way as to cut the citrus-fruit, as described, for example, in the above-mentioned Italian Application No. 45784 A/89, because the action of such blade is carried out during the squashing and its effectiveness is very limited.

SUMMARY OF THE INVENTION

It is an object of the present invention to overcome the above-described restrictions and drawbacks.

This object is achieved by providing a squeezing section, in a machine for squeezing citrus fruit, which as a pair of convergent squeezing plates, a cutting blade, and a driving mechanism which drives the cutting blade toward the squeezing plates before moving the plates toward another to initiate cutting of the fruit before it is squeezed.

BRIEF DESCRIPTION OF THE DRAWINGS

The present invention will be described in more detail below with respect to a preferred embodiment thereof, by way of a non-limitative example only and with reference to the accompanying drawings, in which.

DETAILED DESCRIPTION OF THE PREFERRED EMBODIMENTS

Before the detailed description proceeds, it is to be noted that only the squeezing section of the machine of the invention will be described in detail because the storage section of the machine and the feeding of the single pieces of fruit to be squeezed in each operative cycle of the machine are per se known, as for instance, described in Italian Patent Application No. 45769 A/90 of the same inventor.

Also the respective sections for conveying and collecting the juice of the squeezed fruit and the working residual products, that is the peel of the citrus fruit, can be of a per se known kind as, for instance, described in the above-mentioned Italian patent application.

Figure 3:
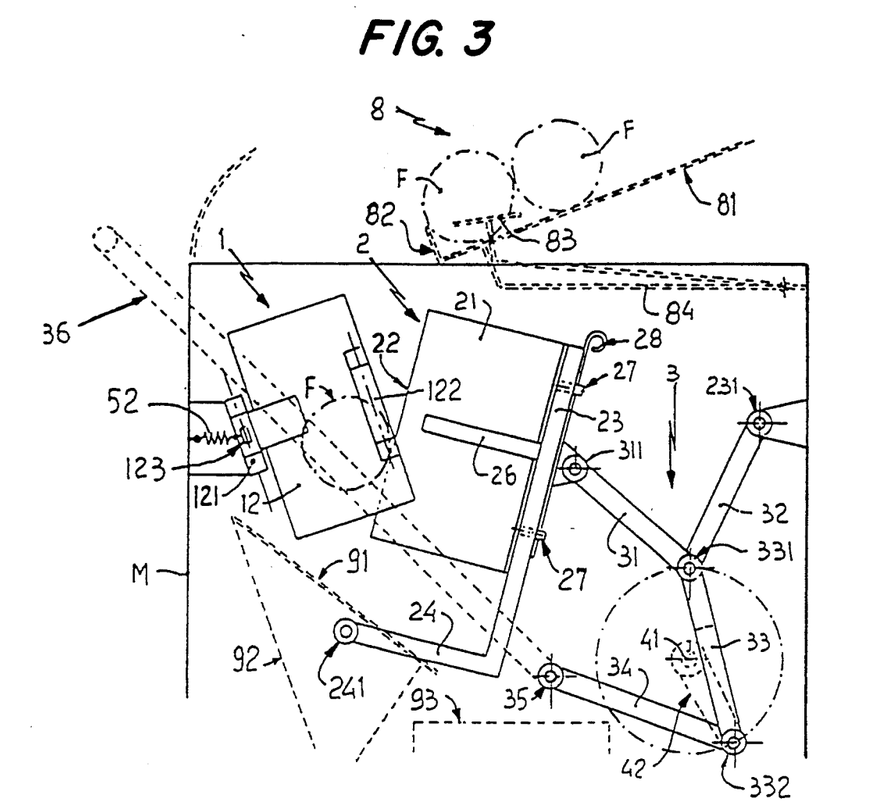
FIGS. 3 and 4 are side and top views, respectively, of the machine in the starting position of an operative cycle.
Figure 5:
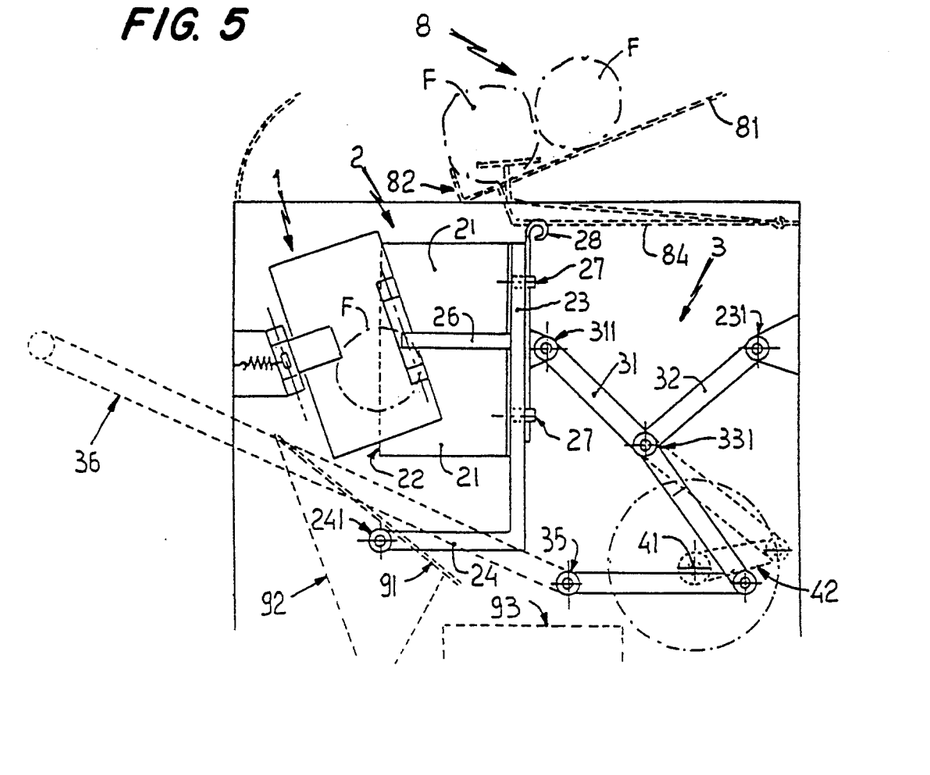
FIGS. 5, 6 and 7, 8 are views similar to FIGS. 3 and 4 but showing the machine in an intermediate position and in the final position of the squeezing operation, respectively.
Figure 6:
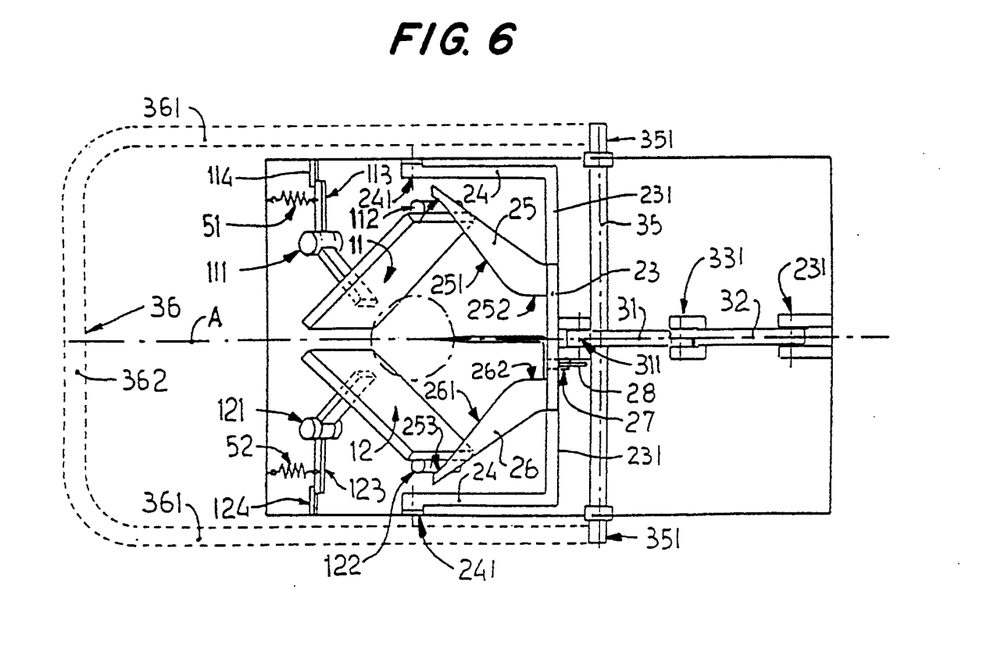
Figure 7:
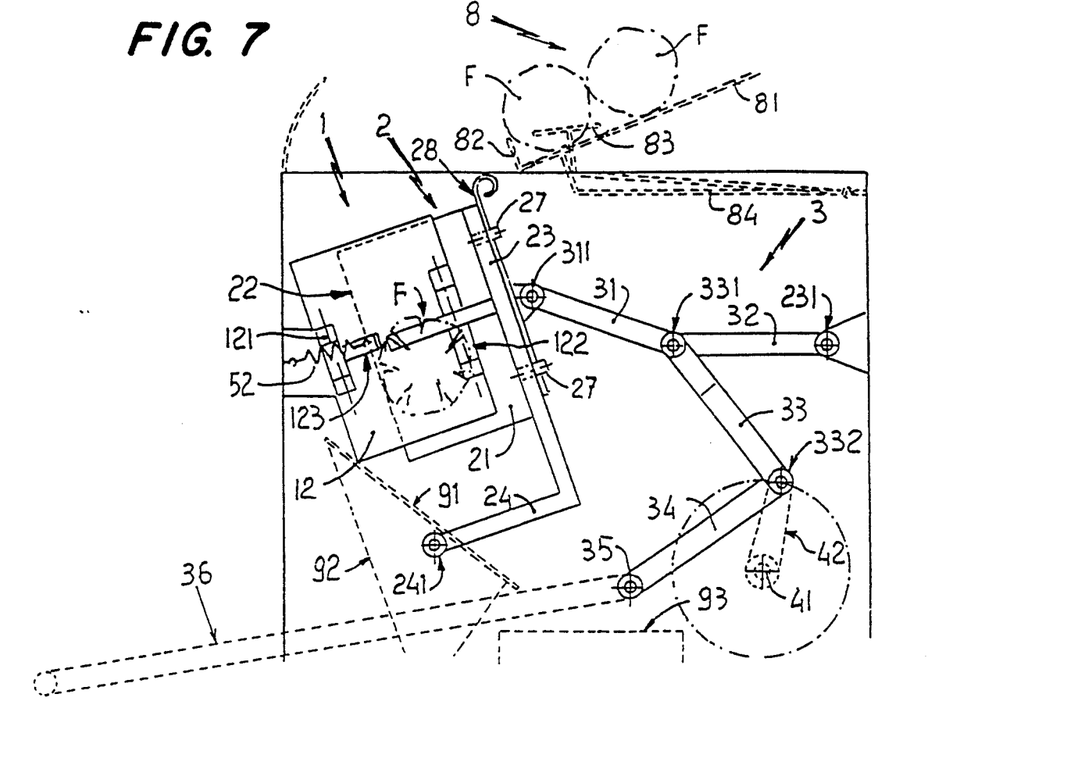

The various elements of these sections of the machine are schematically shown by the thin broken-lines in FIGS. 3, 5 and 7.

With reference to FIGS. 1 to 8, in which the common elements are designated with the same reference numerals, the machine basically comprises: a pair of squeezing plates 1, a cutting blade 2, and a driving lever 3.

Each of the plates 11 and 12 of the pair 1 has a rectangular shape.

The plates 11, 12 are symmetrically disposed with respect to the operative axis A.

The plates 11, 12 are also pivoted at their outer parts on respective pins 111 and 121 mounted on the framework M of the machine.

The cutting blade 2 is constituted by a plate 21 having a sharp outer edge. The plate 21 lies in a plane coincident with the operative axis A and it is removably fitted to a support plate 23. The lower part of the support plate 23 is connected, via two members 231 which laterally protrude from the plate 23, to two side arms 24 having their free ends 241 pivoted on the framework M of the machine.

As can be seen from the figures, the pins 111 and 121 are inclined both downwards and inwards toward the cutting blade 2 so that the respective squeezing plates 11 and 12 are also inclined inwardly downwardly.

The plates 11 and 12 can rotate about the respective pins 111 and 121 between an initial rest position in which the plates 11, 12 are orthogonal to each other as well as mutually symmetrical with respect to the cutting blade 2, and a final squeezing position in which the plates 11, 12 are parallel to each other as well as mutually spaced for reasons hereinafter described.

As can be clearly seen in particular from FIG. 3, showing the machine in its rest position and ready to begin a squeezing cycle, the front edge 22 of the cutting blade 2 is inclined downwards and converges toward the plates 11 and 12.

It follows that the piece of citrus fruit F, loaded into the machine before beginning the squeezing cycle, will fall down along and between the plates 11–12 forming a chute and onto the front edge 22 of the cutting blade 2.

Figure 4:
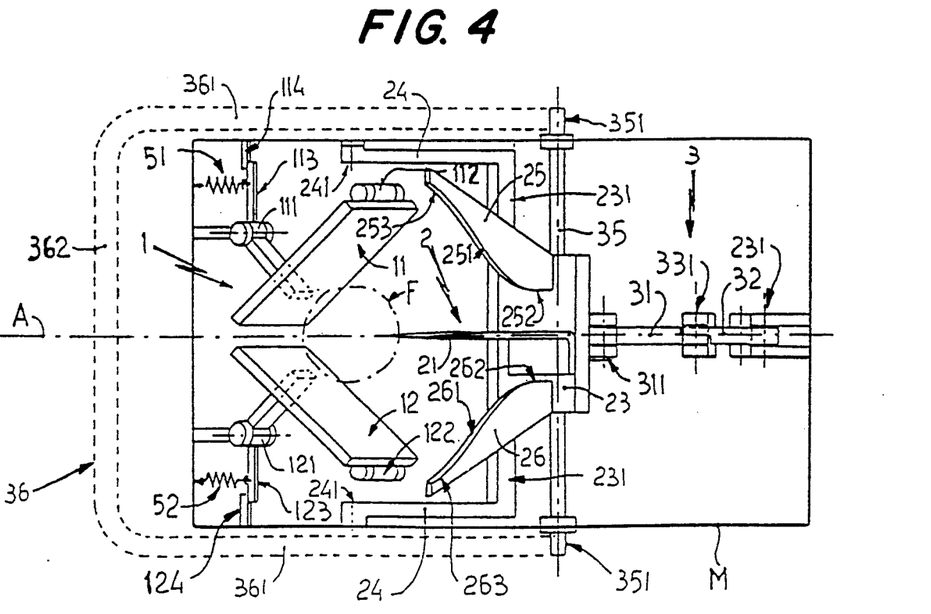

As the plates 11, 12 and the front edge 22 are, at this stage, mutually convergent, the fruit stops while disposed against two points on the inner surfaces of the plates 11 and 12 and on one point of the front edge 22 of the cutting blade 2 in a position clearly shown by the broken lines in FIGS. 3 and 4.

The driving lever 3 drives the movable support unit of the cutting blade 2 that is constituted, as already described, by the support plate 23 and side arms 24.

The driving lever 3 is constituted by a suitable toggle-mechanism comprising two rods 31, 32 and a connecting rod 33.

At this point, the machine can be started either manually, by means of the lever 36 shown by broken lines in FIGS. 3 to 8, or by means of a suitable electric motor and speed reducer (not shown in the figures). One end of the rod 31 is pivoted on the support plate 23 by means of a pin 311.

The rod 32 has one of its ends pivoted on the framework M of the machine by means of a pin 231. The other ends of the rods 31, 32 are mutually pivoted on each other as well as on one end of said connecting rod 33 by means of a common pin 331.

The other end of the connecting rod 33 is pivoted, by means of a drive pin 332, on one end of the rod 34, in the manually driven version of the machine, or on a crank 42 in the motor-driven version.

In the manually driven version, the other end of the rod 34 supported on a transverse shaft 35.

The ends of the transverse shaft 35 are pivoted on the framework M of the machine and protrude outwards from the machine where two respective short portions 351 of the shaft receive the drive lever 36.

The drive lever includes two outer side arms 361 fitted, at respective ends thereof, to said short portions 351, and connected to each other, at their other ends, by a transverse arm 362 that is a comfortable drive handgrip.

In the motor-driven version, the crank 42 is fitted on a drive shaft 41 of the electric motor and speed reducer not shown in the figures.

As already stated, the crank 42, which is shown by dashed lines in FIGS. 3, 5 and 7, is pivoted at its free end on the corresponding end of the connecting rod 33.

Two rolls 112 and 122 are fitted on the outer surfaces of the squeezing plates 11 and 12 in correspondence with their inner side edges.

The rolls 112 and 122 extend for an adequate length along the inner side edges of the plates 11, 12 and they cooperate with respective arms 25-26 which diverge from the support plate 23 in a way that will be hereinafter described in order to drive the squeezing plates 11, 12 from the starting open position, shown in figs. 1, 3 and 4, to the final closed position shown in FIGS. 2, 7 and 8.

As can be particularly seen from FIGS. 3, 5 and 7, the arms 25-26 are constituted by two respective bars which are obtained from a metallic plate having an adequate thickness.

The bars diverge symmetrically from approximately the central portion of said support plate 23.

The inner edges of said bars have such shapes as to present two central portions 251-261 approximately orthogonal to each other and two substantially parallel portions 252-262 which are adequately mutually spaced and are contiguous at respective ends thereof to ends of the central portions 251-261, respectively, and short portions 253-263 which are slightly divergent and are contiguous with the other ends of the central portions 251-261.

The plates 11 and 12 are urged to the starting open position by means of suitable springs 51-52 which are disposed, as can be seen from FIGS. 3 to 8, between the framework M of the machine and respective little arms 113-123 extending radially from the pins 111 and 121.

Moreover, at the starting open position of the plates, the little arms impact respective stop elements 114-124 which consequently delimit their correct positions.

Figure 1:
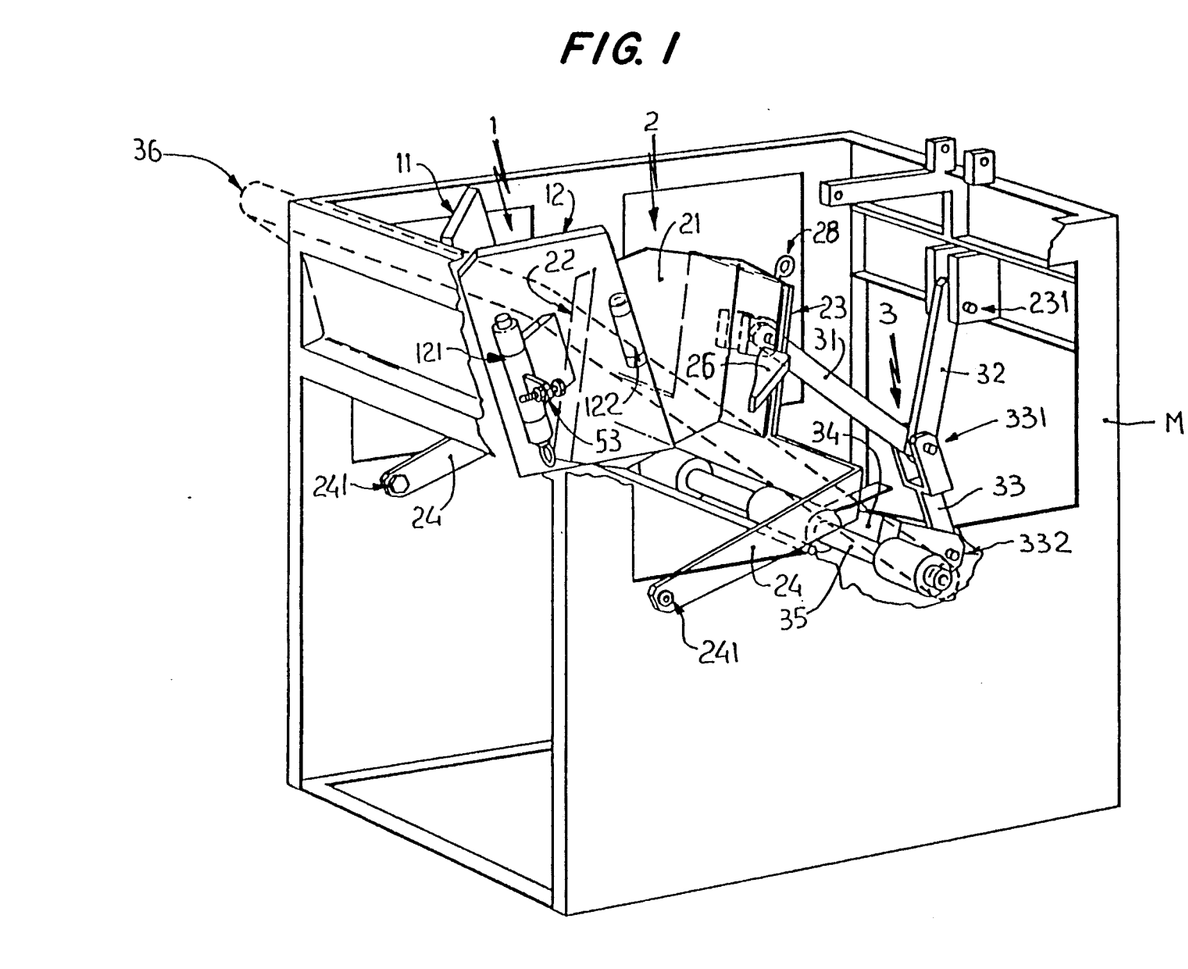
FIGS. 1 and 2 are partially broken-away perspective views of a squeezing portion of a machine for squeezing fruit according to the present invention, showing the starting position of an operative cycle and the final squeezing position.
Figure 2:
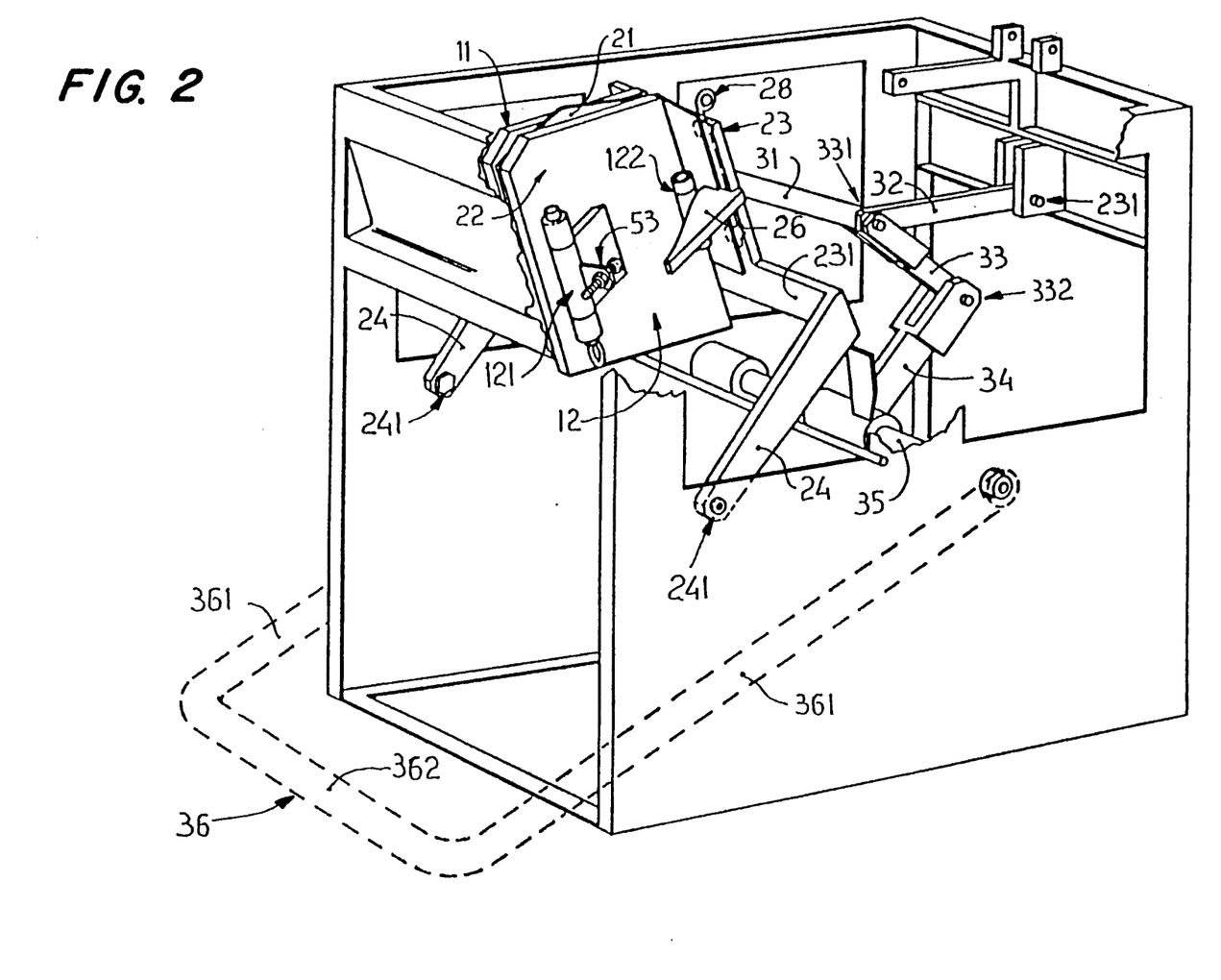

Adjusting means 53, a possible embodiment of which is shown in only FIGS. 1 and 2, can be mounted on the little arms 113-123 in order to enable an accurate adjustment of the open position of the plates 11 and 12.

In FIGS. 3, 5 and 7, some components of the feeding unit 8, and precisely the chute 81 on which the fruit to be squeezed can slide toward the above-described squeezing section, are shown by broken lines.

The chute 81 ends at a step 82 located above the pair of squeezing plates 1 and the cutting blade 2.

Proximate the step 82 is disposed a spoon 83 which is disposed on an oscillating rod 84 which in turn is connected in a suitable manner, not shown in the figures, to the driving mechanism of said squeezing section in order to introduce a single piece of fruit into the squeezing section during every operative cycle of the machine as described in Italian Patent Application No. 45769 A/90.

A grill 91, hopper 92 and container 93 for the collecting the residual products (peels), which are completely identical to the components described in the above-mentioned Italian patent application, are shown schematically in the same figures.

Now the operation of the machine will be described.

At the beginning of the operative cycle, the machine is as shown in FIGS. 1, 3 and 4.

Before the beginning of the operative cycle the fruit F falls down from the spoon 83 to the underlying squeezing unit where it stops in the position shown by the broken lines in FIGS. 3 and 4.

In such a position, as already stated, the fruit halts against two points on the inner surfaces of the plates 11, 12 and on one point of the front edge 22 of the cutting blade 2. At this point, the user grips the transverse arm 362 of the driving lever 36 and lowers the lever 36 to the position shown in FIGS. 2 and 7. Consequently, the transverse shaft 35 rotates and in turn pivots the rod 34.

The rod 34 drives the connecting rod 33 which, in turn, drives, by means of the rods 31-32 as will be hereinafter described, the cutting components and the squeezing components to the position shown in FIGS. 2, 7 and 8 thus resulting in the squeezing of the fruit F.

After the user raises the driving lever 36 to the initial position, the machine is ready to begin a new operative cycle.

In the motorized version the motor/speed reducer completely rotates the crank 42.

Figure 8:
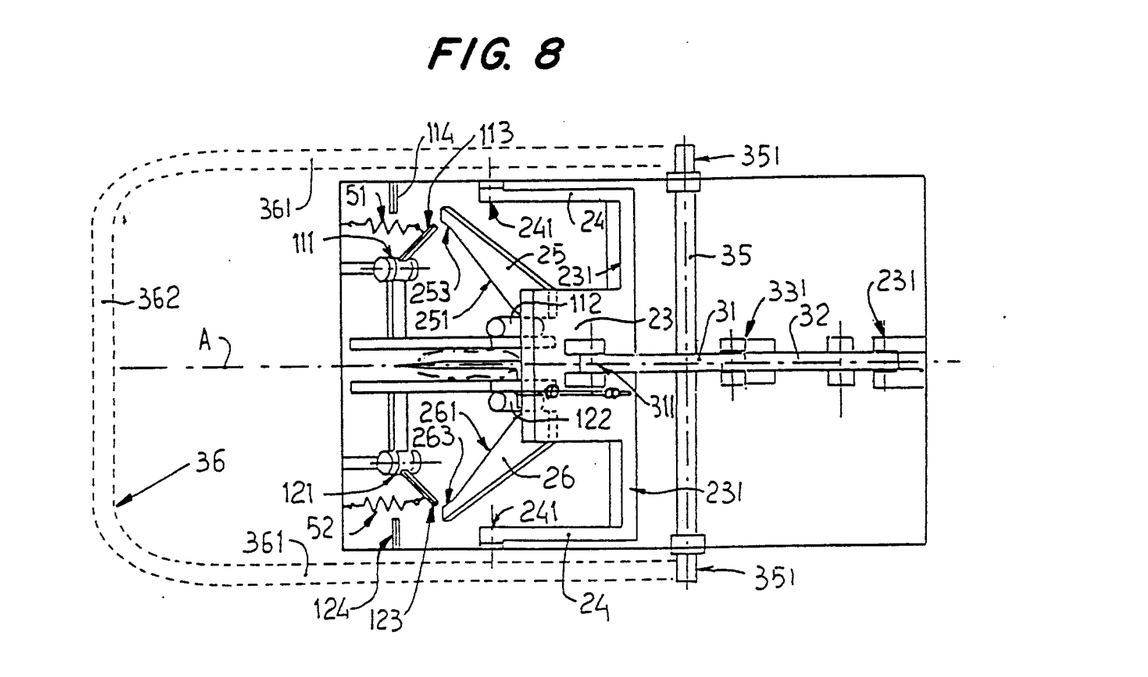

During a first part of the rotation, the crank 42 drives the connecting rod 33 in order to drive, by means of the rods 31-32, the cutting and squeezing components to the position shown in FIGS. 2, 7 and 8, that is the same position as results in the manually driven version.

During a second part of that rotation, the crank 42 drives the connecting rod 33 and, consequently, all other components back to the initial position.

More specifically, referring to FIGS. 3 and 8, the driving pin 332, during a first part of the cycle, moves upwards as can be clearly seen from FIG. 7. Consequently, the connecting rod 33 straddles (opens) the rods 31-32.

As the rod 32 is pivoted on the framework M of the machine by means of the pin 231, and the end of the rod 31 is pivoted on the support plate 23 by means of the pin 311, the support plate and consequently the cutting blade 2 are pushed towards the opposite plates 11-12 and the short portions 253-263 of the inner edges of the arms 25-26 contact the rolls 112-122 as shown in FIG. 5.

During this first phase, clearly, the cutting blade 2 moves towards the fruit F, penetrates the fruit and cuts a fairly good part of it.

Incidentally, it is to be noted that the connecting rod 33 occupies several different positions during this first phase Therefore, the connecting rod 33 is shown in several positions in FIG. 5 by means of a continuous line and a dashed line, respectively.

At the end of such phase, the common pin 331 and consequently the other components (31-32-23-24) are in the same position as described above.

However, the upwards movement of said connecting rod 33, and more precisely of the common pin 331 driven by it, continues and causes a further straddling of the rods 31-32.

Therefore, the cutting blade 2 penetrates progressively into the fruit F and cuts it as far as indicated by the final position of the blade shown in FIGS. 7 and 8, wherein the fruit is completely divided into two parts. As a consequence of the advancement of the support plate 23, the central portions 251-261 of the inner edges of the arms 25-26 slide on the rolls 112-122 and progressively push the plates to pivot about the respective pins 111-121 as far as their closed position. Therefore, the fruit F places between the plates 11-12 is progressively crushed to effect the squeezing and extraction of its juice.

During the final phase of the advancement of the support plate 23, the rolls 112-122 leave the central portions 251-261 of the inner edges of the arms 25-26 and contact parallel portions 252-262.

As is clearly shown in FIG. 8, the portions 252-262 are so mutually spaced as to place the plates 11-12 side-by-side as mutually spaced in order to prevent the squeezing of the fruit's peel and the consequent extraction of its essential oils that, as already mentioned, might adulterate the organoleptic characteristics of the juice squeezed out of the fruit.

During the squeezing step, the juice will fall into the underlying hopper 92.

The hopper 92 will convey the juice to an underlying and suitable collecting container. When the squeezing step is completed, both in the manually and motorized version, the connecting rod 33 is driven back to the starting position and, therefore, the connecting rod 33 will lower the common pin 331.

As a consequence, the rods 31-32 come back from the straddled position to a mutually as ell as progressively approaching position thus moving the support plate 23 away from said plates 11-12.

While the plate 23 moves away from the plates 11-12, the respective arms 25-26 move away from the same. Therefore, as the plates are moved away from each other by the respective springs 51-52, the corresponding rolls 112-122 leave the portions 252-262 of the inner edges of said arms 25-26 and contact the portions 251-261.

The rolls 112-122 slide on the edges of the arms until the rolls 112-122 reach the end of the short portions 252-263 of the edges whereat the little arms 113-123 abut the respective stopping elements 114-124 thus placing the respective plates 11-12 in their maximum opening position. The movement of the support plate 23 away from the plates 11-12 continues until the connecting rod 33 is returned to the starting position at which time the machine is stopped and is thus ready to begin another operative cycle.

Clearly, the above-described opening of the plates 11-12 release the residue of the squeezed fruit (that is the citrus fruit's peel) from the plates and cause the same to fall into the underlying inclined grill 91 whereon it can slide ultimately reaching the collecting container 93.

Incidentally, it is to be pointed out that with the movement which brings the plates back to the starting position, the connecting rod 33, or other suitable components of the respective kinematic unit, drives the oscillating rod 84 to raise the respective spoon 83.

The spoon 83, in turn, pushes upwards the lead piece of fruit F that is supported on chute 81 until the fruit is raised over the step 82 and falls down onto the underlying plates 11-12 and cutting blade 2 and into the previously described position.

Moreover, the cutting blade 2 is removably connected to the support plate 23 by means of suitable pegs 27, as can be seen, for example, in FIGS. 3 to 8.

The pegs 27 are received in corresponding holes extending through the support plate 23 and protruding from the outer side of the support plate.

A stem 28 can be inserted or pulled out of respective holes extending through the short portions of said pegs 27 in order to allow the pegs 27 to be connected as well as removed from the support plate 23 in a simple and quick way.

Also the pins 111 and 121 are designed to be easily assembled and disassembled in order to allow the connection and the removal of the respective plates 11-12. All components which need a periodic cleaning can be assembled and disassembled to and from the machine.

The cleaning operation can be carried out in a complete and quick way thus assuring, consequently, maximum hygiene when the machine is used.

It should thus be clear that the machine of the present invention is very advantageous compared to those well-known machines.

In the first place, it is a structurally very simple and consequently an inexpensive machine.

Further, the machine works in a simple and safe way, it can be either manually or motor-driven without modification to its basic structure. Therefore, the kind of driven version can be chosen during the manufacturing of the machine without creating difficulties or necessitating changes.

In fact, it will be possible to adopt the manually driven version or the motor-driven solution simply by providing a manual driving lever or a suitable motor/speed reducer to a set of common elements.

In the end, the machine of the present invention is effective for a very wide dimensional range of fruit. Because the fruit is cut before the squeezing of the same, the machine avoids all sorts of drawbacks otherwise caused by the extraction of the aromatic substances which would flow into the juice of the squeezed fruit changing the taste and the smell thereof.

It will be well understood that modifications and variations may be made to the machine of the present invention without departing, however, from the scope of the following claims.

I claim:

1. A machine for squeezing fruit, said machine comprising: a framework; a squeezing section in which the fruit is squeezed; a feeding section which feeds fruit to said squeezing section; and discrete conveying/collecting sections which convey and collect juice from the fruit and residual of the fruit, respectively; said squeezing section including two plates having rear edges adjacent one another and being supported so as to be swingable between a starting position at which said plates converge toward said rear edges thereof and collectively form a downwardly inclined chute and a squeezing position at which said plates are in a mutually facing relation, return springs urging said plates to said starting position, a cutting blade having a cutting edge facing said plates, the plates disposed laterally of and symmetrically with respect to said cutting blade, a support plate to which said cutting blade is mounted, said support plate being supported in the machine so as to be movable between a starting position at which the cutting edge of said cutting blade is remote from the rear edges of said plates and a cutting position at which said cutting edge is located adjacent the rear edges of said plates, and driving means for progressively swinging said two plates from the starting position thereof to said squeezing position and for moving said support plate a substantial amount from said starting position thereof towards said cutting position prior to the swinging of said two plates from said starting position thereof to said squeezing position such that said cutting blade will cut substantially into a piece a fruit received on the downwardly inclined chute before the piece of fruit is squeezed by said squeezing plates.

2. A machine for squeezing fruit as claimed in claim 1, wherein said driving means includes rolls disposed on said plates, arms extending from said support plate and having camming edges which engage said rolls as said support plate is brought to said cutting position in order to cam said plates to said squeezing position thereof against forces exerted by said return springs, and a compound lever connected to said support plate, said compound lever including a plurality of links pivotably connected to one another.

3. A machine for squeezing fruit as claimed in claim 2, wherein said support plate is pivotably supported in the machine so as to be pivotable between said starting position thereof and said cutting position.

4. A machine for squeezing fruit as claimed in claim 1, wherein said cutting blade is detachably mounted to said support plate.

5. A machine for squeezing fruit as claimed in claim 3, wherein said cutting blade is detachably mounted to said support plate.

6. A machine for squeezing fruit as claimed in claim 2, wherein said driving means further includes a manually operable lever connected to said compound lever.

7. A machine for squeezing fruit as claimed in claim 2, wherein said driving means further includes a crank connected to said compound lever, and an electric motor and speed reducer connected to said crank so as to rotate said crank.

8. A machine for squeezing fruit as claimed in claim 1, and further comprising pins disposed at a fixed location in the machine laterally of and symmetrical to a plane coincident with said cutting blade, said pins extending parallel to one another and being inclined downwardly toward said support plate, said plates being rotatably supported by said pins so as to be swingable about said fixed locations between the starting position of the plates and said squeezing position thereof, and said pins being spaced apart from one another by such a distance that said plates are parallel and spaced from one another when in said squeezing position.

9. A machine for squeezing fruit as claimed in claim 2, and further comprising pins disposed at a fixed location in the machine laterally of and symmetrical to a plane coincident with said cutting blade, said pins extending parallel to one another and being inclined downwardly toward said support plate, said plates being rotatably supported by said pins so as to be swingable about said fixed locations between the starting position of the plates and said squeezing position thereof, and said pins being spaced apart from one another by such a distance that said plates are parallel and spaced from one another when in said squeezing position.

10. A machine for squeezing fruit as claimed in claim 1, and further comprising arms connected to said plates, respectively, so as to swing therewith, and stopper elements which engage said arms so as to limit movement of said plates and establish said squeezing position thereof, said return springs being connected to said arms so as to bias said two plates to said starting position thereof via said arms.

11. A machine for squeezing fruit as claimed in claim 2, and further comprising arms connected to said plates, respectively, so as to swing therewith, and stopper elements which engage said arms so as to limit movement of said plates and establish said squeezing position thereof, said return springs being connected to said arms so as to bias said two plates to said starting position thereof via said arms.

12. A machine for squeezing fruit as claimed in claim 8, and further comprising arms extending from said fixed locations where said pins are disposed and connected to said plates so as to swing therewith, and stopper elements which engage said arms so as to limit movement of said plates and establish said squeezing position thereof, said return springs being connected to said arms so as to bias said two plates to said starting position thereof via said arms.

13. A machine for squeezing fruit as claimed in claim 9, and further comprising arms extending from said fixed locations where said pins are disposed and connected to said plates so as to swing therewith, and stopper elements which engage said arms so as to limit movement of said plates and establish said squeezing position thereof, said return springs being connected to said arms so as to bias said two plates to said starting position thereof via said arms.

14. A machine for squeezing fruit as claimed in claim 2, wherein said arms are disposed laterally of and symmetrically to said cutting blade and extend from sides of said support plate at approximately a longitudinally central location of said support plate, said edges of the arms being defined at inner portions of the arms facing each other, and said edges having respective central portions which are substantially rectilinear and extend orthogonally to one another, parallel portions each of which extends from one end of a respective said central portion to said support plate, and short portions each of which extends from the other end of a respective said central portion at free ends of said arms, the short portions extending in directions slightly divergent from one another away from said central portions.

15. A machine for squeezing fruit as claimed in claim 1, wherein said compound lever is a toggle joint, and said links include two rods having respective first ends pivotably connected to one another and respective second ends pivotably connected to said support plate and to said framework, respectively, and a connecting rod having one end pivotably connected to the first ends of said two rods.

16. A machine for squeezing fruit as claimed in claim 6, wherein said compound lever is a toggle joint, and said links include two rods having respective first ends pivotably connected to one another and respective second ends pivotably connected to said support plate and to said framework, respectively, and a connecting rod having one end pivotably connected to the first ends of said two rods and another end connected to said manually operatable lever.

17. A machine for squeezing fruit as claimed in claim 7, wherein said compound lever is a toggle joint, and said links include two rods having respective first ends pivotably connected to one another and respective second ends pivotably connected to said support plate and to said framework, respectively, and a connecting rod having one end pivotably connected to the first ends of said two rods and another end pivotably connected to said crank.

* * * * *